(12) United States Patent
Fukui et al.

(10) Patent No.: US 12,345,539 B2
(45) Date of Patent: Jul. 1, 2025

(54) INFORMATION PROCESSING DEVICE, INFORMATION OUTPUT METHOD, PROGRAM, AND STORAGE MEDIUM

(71) Applicant: PIONEER CORPORATION, Tokyo (JP)

(72) Inventors: Kotaro Fukui, Kawagoe (JP); Masahiro Iwata, Kawagoe (JP); Shota Izumi, Kawagoe (JP); Yohei Onuma, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 36 days.

(21) Appl. No.: 17/782,074

(22) PCT Filed: Jan. 14, 2021

(86) PCT No.: PCT/JP2021/000974
§ 371 (c)(1),
(2) Date: Jun. 2, 2022

(87) PCT Pub. No.: WO2021/192511
PCT Pub. Date: Sep. 30, 2021

(65) Prior Publication Data
US 2023/0003538 A1    Jan. 5, 2023

(30) Foreign Application Priority Data
Mar. 27, 2020 (JP) ................. 2020-057708

(51) Int. Cl.
*G01C 21/36* (2006.01)
*G01C 21/34* (2006.01)

(52) U.S. Cl.
CPC ....... *G01C 21/3629* (2013.01); *G01C 21/343* (2013.01); *G01C 21/3691* (2013.01)

(58) Field of Classification Search
CPC .............. G01C 21/3629; G01C 21/343; G01C 21/3691
See application file for complete search history.

(56) References Cited

U.S. PATENT DOCUMENTS

| | | | |
|---|---|---|---|
| 6,278,943 B1* | 8/2001 | Yamauchi | G01C 21/3629 340/988 |
| 9,429,436 B2* | 8/2016 | Wippler, III | G01C 21/26 |

(Continued)

FOREIGN PATENT DOCUMENTS

| | | |
|---|---|---|
| JP | 10-82653 | 3/1998 |
| JP | 2000-258179 | 9/2000 |

(Continued)

OTHER PUBLICATIONS

International Search Report for PCT/JP2021/000974 dated Mar. 2, 2021, 5 pages.

(Continued)

*Primary Examiner* — Wade Miles
*Assistant Examiner* — Aaron G Cain
(74) *Attorney, Agent, or Firm* — NIXON & VANDERHYE

(57) ABSTRACT

The information processing device provides information relating to a movement of a mobile body. The receiving unit receives an information request. The load determination unit determines a load of a driver with respect to a driving of the mobile body. The voice output unit outputs, in response to the information request, a basic information when the load is large, and an additional information in addition to the basic information when the load is small.

8 Claims, 5 Drawing Sheets

(56) References Cited

U.S. PATENT DOCUMENTS

| | | | |
|---|---|---|---|
| 10,137,902 B2* | 11/2018 | Juneja | G01C 21/3661 |
| 2006/0069500 A1 | 3/2006 | Hashizume | |
| 2006/0080034 A1 | 4/2006 | Hayashi | |
| 2016/0202069 A1* | 7/2016 | Wippler, III | G01C 21/26 |
| | | | 701/400 |
| 2016/0236690 A1* | 8/2016 | Juneja | G01C 21/3661 |
| 2018/0266842 A1 | 9/2018 | Di Censo | |

FOREIGN PATENT DOCUMENTS

| | | |
|---|---|---|
| JP | 2004-53267 | 2/2004 |
| JP | 2017-138277 | 8/2017 |

OTHER PUBLICATIONS

Written Opinion of the ISA for PCT/JP2021/000974 dated Mar. 2, 2021, 4 pages.
European Search Report, issued in European Patent Application No. 21776127.9 dated Apr. 15, 2024.

* cited by examiner

FIG. 3

<GUIDANCE INFORMATION>

| USER'S INFORMATION REQUEST | DRIVING LOAD & TRAVELING STATE | BASIC INFORMATION | ADDITIONAL INFORMATION |
|---|---|---|---|
| NEXT ACTION TO BE TAKEN (ex) "WHERE SHOULD I TURN NEXT ?" | DRIVING LOAD: LARGE (ex) DURING TRAVELING | NEXT GUIDING POINT | [OMITTED] |
| | DRIVING LOAD: SMALL (ex) PARKING, STOPPING | NEXT GUIDING POINT | FURTHER NEXT (2ND) GUIDING POINT |
| | DRIVING LOAD: LARGE (ex) ALREADY IN INTERSECTION OF GUIDING POINT | FURTHER NEXT (2ND) GUIDING POINT | [OMITTED] |
| SCHEDULE TO ARRIVE AT DESTINATION (ex) "HOW LONG DOES IT TAKE?" | DRIVING LOAD: LARGE (ex) TRAVELING | REMAINING DISTANCE TO DESTINATION / ARRIVAL TIME | [OMITTED] |
| | DRIVING LOAD: SMALL (ex) PARKING, STOPPING | REMAINING DISTANCE TO DESTINATION / ARRIVAL TIME | USE TOLL ROAD OR NOT, NEXT IC |
| LOCATION OF DESTINATION (ex) "WHICH DIRECTION IS DESTINATION?" | NOT DEPEND ON DRIVING LOAD (ADDITIONAL INFORMATION NOT NECESSARY) | DIRECTION OF DESTINATION (ex: "DIRECTION OF 3 O'CLOCK") | NONE |

INFORMATION PROCESSING DEVICE, INFORMATION OUTPUT METHOD, PROGRAM, AND STORAGE MEDIUM

CROSS-REFERENCE TO RELATED APPLICATIONS

This application is the U.S. national phase of International Application No. PCT/JP2021/000974 filed Jan. 14, 2021 which designated the U.S. and claims priority to Japanese Patent Application No. 2020-057708 filed Mar. 27, 2020, the entire contents of each of which are hereby incorporated by reference.

BACKGROUND OF THE INVENTION

Field of the Invention

The present invention relates to route guidance by voice.

Description of the Related Art

Conventionally, there is known a navigation device for performing route guidance to a destination by voice. For example, Patent Document 1 discloses a voice navigation system for notifying the approximate distance and orientation from the current location to the destination by increasing the spread of the sound field as the distance from the current location to the destination is small, and localizing the sound output from the speaker so that the sound is heard from the direction of the destination with respect to the head of the user.

PRECEDING TECHNICAL REFERENCES

Patent References

Patent Reference 1: Japanese Patent Application Laid-open under 2017-138277

SUMMARY OF THE INVENTION

In the voice navigation device which performs route guidance by voice, basically the guide route is not displayed. Therefore, the driver may become anxious whether he/she is driving correctly according to the guide route, and may ask questions about the guide route. In this case, the voice navigation device is required to present information requested by the driver according to the driving situation.

The present invention has been made to solve the problems as described above, and a main object thereof is to provide an information processing device capable of presenting information requested by the driver according to the driving situation.

A first embodiment is an information processing device which provides information relating to a movement of a mobile body, comprising: a receiving unit configured to receive an information request; a load determination unit configured to determine a load of a driver with respect to a driving of the mobile body; and a voice output unit configured to output, in response to the information request, a basic information when the load is large, and an additional information in addition to the basic information when the load is small.

Another embodiment is an information output method executed by an information processing device which provides information relating to a movement of a mobile body, comprising: a receiving process of receiving an information request; a load determination process of determining a load of a driver with respect to a driving of the mobile body; and a voice output process of outputting, in response to the information request, a basic information when the load is large, and an additional information in addition to the basic information when the load is small.

A further embodiment is a program executed by an information processing device including a computer and provides information relating to a movement of a mobile object, the program causing the computer to function as: a receiving unit configured to receive an information request; a load determination unit configured to determine a load of a driver with respect to a driving of the mobile body; and a voice output unit configured to output, in response to the information request, a basic information when the load is large, and an additional information in addition to the basic information when the load is small.

Yet another embodiment is an information processing device which provides information relating to a movement of a mobile body, comprising: a receiving unit configured to receive an information request; and a voice output unit configured to output, in response to the information request, the information of a next guiding point during a travelling of the mobile body and when the mobile body is located in an intersection, and output the information of the next guiding point and a second guiding point when the mobile body is stopped outside the intersection.

BRIEF DESCRIPTION OF THE DRAWINGS

FIG. 3 illustrates examples of guidance information.

DETAILED DESCRIPTION OF THE PREFERRED EMBODIMENTS

Figure 1:
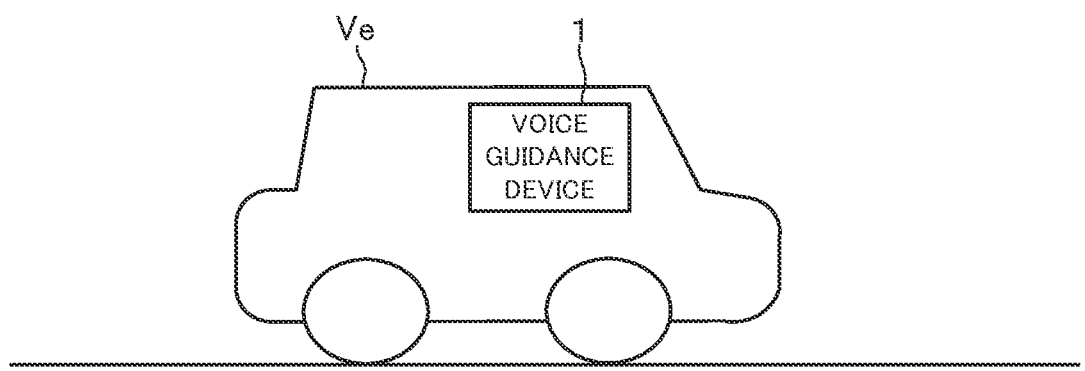
FIG. 1 illustrates a configuration example of a voice guidance system according to a first embodiment.

According to a preferred embodiment of the present invention, there is provided an information processing device which provides information relating to a movement of a mobile body, comprising: a receiving unit configured to receive an information request; a load determination unit configured to determine a load of a driver with respect to a driving of the mobile body; and a voice output unit configured to output, in response to the information request, a basic information when the load is large, and an additional information in addition to the basic information when the load is small.

The above information processing device provides information relating to a movement of a mobile body. The receiving unit receives an information request. The load determination unit determines a load of a driver with respect to a driving of the mobile body. The voice output unit outputs, in response to the information request, a basic information when the load is large, and an additional information in addition to the basic information when the load is small. Thus, in response to the information request, an appropriate information can be outputted in accordance with the load of the driver.

In one mode of the above information processing device, the load determination unit determines that the load is large while the mobile body is traveling and when the mobile body is positioned within an intersection, and determines that the load is small when the mobile body is stopped outside the intersection.

In another mode of the above information processing device, the information request is related to a next action to be taken with respect to a traveling of the mobile body. The voice output unit outputs the information of a next guiding point as the basic information during the traveling of the mobile body, and outputs the next guiding point as the basic information and outputs the information of a second guiding point as the additional information when the mobile body is stopped outside the intersection.

In still another mode of the above information processing device, the information request is related to a next action to be taken with respect to a traveling of the mobile body. The voice output unit outputs the information of a next guiding point of an intersection as the basic information when the mobile body is positioned within the intersection.

In still another mode of the above information processing device, the information request relates to an arrival schedule to a destination of the mobile body. The voice output unit outputs at least one of a remaining distance to the destination and an expected arrival time as the basic information while the mobile body is traveling, and outputs information regarding a use of a toll road as the additional information in addition to at least one of the remaining distance to the destination and the expected arrival time as the basic information when the mobile body is stopped outside the intersection.

In still another mode of the above information processing device, the load determination unit determines the load based on at least one of a shape of a road on which the mobile body travels, necessity of lane change of the mobile body, traffic conditions around the mobile body, and biometric information of the driver.

According to another preferred embodiment of the present invention, there is provided an information output method executed by an information processing device which provides information relating to a movement of a mobile body, comprising: a receiving process of receiving an information request; a load determination process of determining a load of a driver with respect to a driving of the mobile body; and a voice output process of outputting, in response to the information request, a basic information when the load is large, and an additional information in addition to the basic information when the load is small.

According to still another preferred embodiment of the present invention, there is provided a program executed by an information processing device including a computer and provides information relating to a movement of a mobile object, the program causing the computer to function as: a receiving unit configured to receive an information request; a load determination unit configured to determine a load of a driver with respect to a driving of the mobile body; and a voice output unit configured to output, in response to the information request, a basic information when the load is large, and an additional information in addition to the basic information when the load is small. By executing the program by the computer, the above information processing device may be realized. This program can be stored in a storage medium and used.

According to still another preferred embodiment of the present invention, there is provided an information processing device which provides information relating to a movement of a mobile body, comprising: a receiving unit configured to receive an information request; and a voice output unit configured to output, in response to the information request, the information of a next guiding point during a travelling of the mobile body and when the mobile body is located in an intersection, and output the information of the next guiding point and a second guiding point when the mobile body is stopped outside the intersection.

The information processing device provides information relating to a movement of a mobile body. The receiving unit receives an information request. The voice output unit outputs, in response to the information request, the information of a next guiding point during a travelling of the mobile body and when the mobile body is located in an intersection, and outputs the information of the next guiding point and a second guiding point when the mobile body is stopped outside the intersection.

Embodiments

Hereinafter, suitable embodiments of the present invention will be described with reference to drawings.

First Embodiment

[System Configuration]

FIG. 1 illustrates a configuration example of a voice guidance system according to a first embodiment of the information processing device of the present invention. The voice guidance system includes a vehicle Ve and a voice guidance device 1.

The voice guidance device 1 moves with the vehicle Ve, and performs a route guidance mainly by voice so that the vehicle Ve travels along the route to be guided (also referred to as "guide route"). Incidentally, the "route guidance mainly by voice" refers to a route guidance in which the user can obtain information necessary for driving the vehicle Ve along the guide route at least from the voice only, and it does not intend to exclude that the voice guidance device 1 supplementarily displays the map around the current position. In this embodiment, the voice guidance device 1 outputs at least information relating to a point (also referred to as a "guiding point") on a route where guidance is necessary by voice. Here, for example, the guiding point includes intersections with the right/left turn of the vehicle Ve, and other important passing points for the vehicle Ve to travel along the guide route. For example, the voice guidance device 1 performs voice guidance related to the guiding point, such as the distance from the vehicle Ve to the next guiding point and the traveling direction at the guiding point. Hereafter, the voice related to the guidance of the guidance route is also referred to as "route voice guidance".

Incidentally, the voice guidance device 1 may be an on-vehicle device mounted or attached to the vehicle Ve, or may be a portable terminal to be brought and utilized in a vehicle such as a smartphone. In yet another example, the voice guidance device 1 may be incorporated into the vehicle Ve. The voice guidance device 1 is an example of an "information processing device". Further, the vehicle Ve is an example of a "mobile body".

[Device Configuration]

Figure 2:
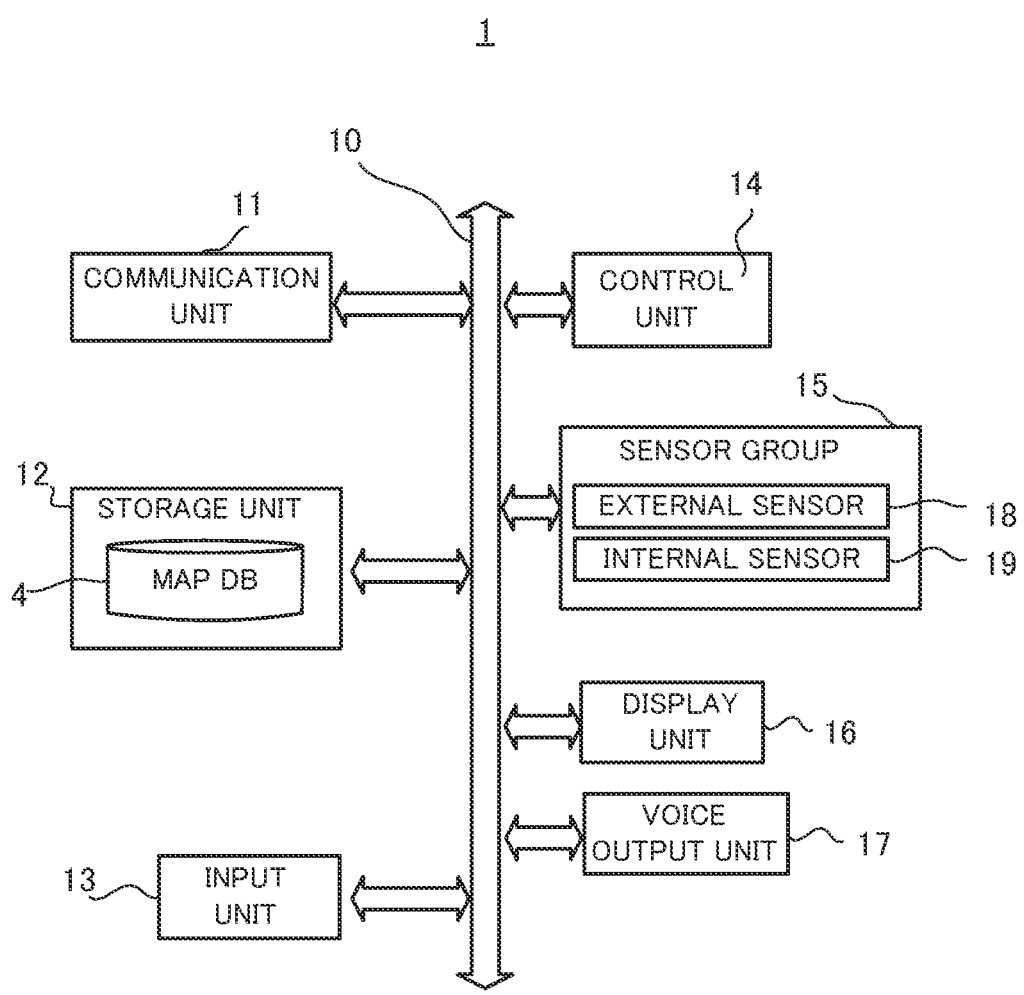
FIG. 2 illustrates an example of a schematic configuration of a voice guidance device.

FIG. 2 shows an example of a schematic configuration of a voice guidance device 1. The voice guidance device 1 mainly includes a communication unit 11, a storage unit 12, an input unit 13, a control unit 14, a sensor group 15, a display unit 16, and a voice output unit 17. Each element in the voice guidance device 1 is connected to each other via a bus line 10.

The communication unit 11 performs data communication with the other terminals based on the control of the control unit 14. For example, the communication unit 11 may receive map data for updating the map DB (DataBase) 4 to be described later from a map management server (not shown).

The storage unit 12 is composed of various memories such as a RAM (Random Access Memory), a ROM (Read Only Memory), and a non-volatile memory (including a hard disk drive, a flash memory, and the like). The storage unit 12 stores a program for the voice guidance device 1 to execute a predetermined process. The above-described program may include an application program for performing the route guidance by voice, an application program for playing music, an application program for outputting content other than music (such as a TV), and the like. The storage unit 12 is also used as a work memory of the control unit 14. The program to be executed by the voice guidance device 1 may be stored in a storage medium other than the storage unit 12.

Further, the storage unit 12 stores the map DB 4. The map DB 4 records various types of data required for the route guidance. The map DB 4 is a database that includes, for example, road data representing a road network by a combination of nodes and links, and facility data representing facilities that are candidates for a destination, stopover points, or landmarks. The map DB 4 may be updated based on the map information that the communication unit 11 receives from the map management server, under the control of the control unit 14.

The input unit 13 is a button, a touch panel, a remote controller, a voice input device, or the like for the user to operate. The display unit 16 is a display or the like for performing display under the control of the control unit 14. The voice output unit 17 is a speaker or the like for outputting sound under the control of the control unit 14.

The sensor group 15 includes an external sensor 18 and an internal sensor 19. The external sensor 18 may be one or more sensors for recognizing the surrounding environment of the vehicle Ve such as a camera, a lidar, a radar, an ultrasonic sensor, an infrared sensor, a sonar, and the like. The internal sensor 19 is a sensor for positioning the vehicle Ve, for example, a GNSS (Global Navigation Satellite System) receiver, a gyroscopic sensor, IMU (Inertial Measurement Unit), a vehicle speed sensor, or a combination thereof. The sensor group 15 may have a sensor by which the control unit 14 can directly or indirectly (i.e., by performing the estimation process) derive the position of the vehicle Ve from the output of the sensor group 15.

The control unit 14 includes a CPU (Central Processing Unit), a GPU (Graphics Processing Unit), and the like, and controls the entire voice guidance device 1. For example, based on the output of one or more sensors of the sensor group 15, the control unit 14 estimates the position of the vehicle Ve (including the direction of the traveling direction). Further, when the destination is designated by the input unit 13, the control unit 14 generates a route information indicating a guide route to the destination, and performs the route guidance based on the route information, the position information of the estimated vehicle Ve, and the map DB 4. In this case, the control unit 14 controls the voice output unit 17 to output the route voice guidance. Further, the control unit 14 controls the display unit 16 to display the information of the music being played, the video content, or as a map around the current position.

In the above configuration, the input unit 13 is an example of a reception unit, and the control unit 14 is an example of a load determination unit.

Incidentally, the processing executed by the control unit 14 is not limited to be realized by software by a program, and it may be realized by any combination of hardware, firmware, and software. The process executed by the control unit 14 may be realized by an integrated circuit that can be programmed by the user, for example, a FPGA (field-programmable gate array) or a microcomputer. In this case, a program that the control unit 14 implements in this embodiment may be realized by the integrated circuit. Thus, the control unit 14 may be realized by hardware other than the processor.

The configuration of the voice guidance device 1 shown in FIG. 2 is merely an example, and various changes may be made to the configuration shown in FIG. 2. For example, instead of storing the map DB 4 in the storage unit 12, the control unit 14 may receive information required for the route guidance through the communication unit 11 from the map management server (not shown). In another example, instead of providing the voice output unit 17, the voice guidance device 1 may be connected, electrically or by known communication means, to a different voice output unit 17 which is configured separately from the voice guidance device 1, and the different voice output unit 17 may output the sound. In this case, the different voice output unit 17 may be a speaker provided in the vehicle Ve. In yet another example, the voice guidance device 1 may not include a display unit 16. In this case, the voice guidance device 1 may not perform any control relating to the display. Alternatively, by electrically connecting to the display unit provided in the vehicle Ve or the like by a wired or wireless connection, the voice guidance device 1 may make the display unit execute a predetermined display. Similarly, instead of including the sensor group 15, the voice guidance device 1 may acquire information outputted by the sensors attached to the vehicle Ve from the vehicle Ve, based on a communication protocol such as CAN (Controller Area Network).

[Request for Information]

In this embodiment, the user operates the input unit 13 to request information on the guide route. For example, the user presses a button constituting the input unit 13, and then makes an information request by voice input. Incidentally, the "user" here may be a driver of the vehicle Ve, or may be a passenger. The information request is intended to request information on the guide route. Specifically, the information request includes "actions to be performed next," "schedule of arrival at the destination," and "location of the destination." Incidentally, other information requests may be performed.

The voice guidance device 1 responds to the information request as described above by making the voice output of the guidance information from the voice output unit 17. Here, in this embodiment, the voice guidance device 1 changes the amount of information of the guidance information to be outputted, in accordance with the driver's driving load at the time when the information request is made. Specifically, the voice guidance device 1 outputs only the basic information when the driver's driving load is large, and outputs additional information in addition to the basic information when the driver's driving load is small. This is because the amount of information should be minimized so as not to impair the driver's attention when the driving load is large. On the other hand, since there is room for the driver when the driving load is small, the additional information is provided. The contents of the basic information and the additional information depend on the contents of the information request by the user.

FIG. 3 shows examples of guidance information for a user's information request. As shown, the guidance information is prepared for each type of information request and according to the traveling state of the vehicle. It will be described below for each type of information request.

(1) Next Action to be Taken

The user's information request about the next action to be taken is, for example, "Where should I turn next?" When the driving load is large, e.g., when the vehicle is traveling, the voice guidance device 1 outputs only the information of the next guiding point as the basic information, and does not output the additional information. On the other hand, when the driving load is small, e.g., when the vehicle is parking outside the intersection or stopping, the voice guidance device 1 outputs the information of the next guiding point as the basic information, and further outputs the information of the further next (i.e., second) guiding point as the additional information. Incidentally, among the case where the driving load is large, when the vehicle has entered the intersection of the guiding point, the voice guidance device 1 outputs the information of the guiding point ahead (i.e., the second guiding point) as the basic information. That is, when the vehicle has already entered the intersection of the guiding point, since it is meaningless to output the information of the guiding point, the voice guidance device 1 outputs the information of the next guiding point as the basic information.

(2) Schedule to Arrive at the Destination

The user's information request about the schedule to arrive at the destination is, for example, "How long does it take to arrive?" When the driving load is large, e.g., when the vehicle is traveling, the voice guidance device 1 outputs at least one of the remaining distance and the arrival time to the destination as the basic information, and does not output the additional information. On the other hand, when the driving load is small, e.g., when the vehicle is parking outside the intersection or stopping, the voice guidance device 1 outputs at least one of the remaining distance and the arrival time to the destination as the basic information, and further outputs information as to whether or not the toll road is used or the information of the next interchange (IC) as the additional information.

(3) Location of Destination

The user's information request regarding the location of the destination is, for example, "Which direction is the destination?" or the like. In this case, since no additional information is particularly required for the information requested by the user, the voice guidance device 1 outputs the direction of the destination as the basic information, regardless of the driving load.

As described above, in this embodiment, the amount of information to be outputted in response to the information request of the user is changed in accordance with the driver's driving load. Thus, it is possible to provide the requested information depending on the driving situation.

[Information Output Processing]

Figure 4:
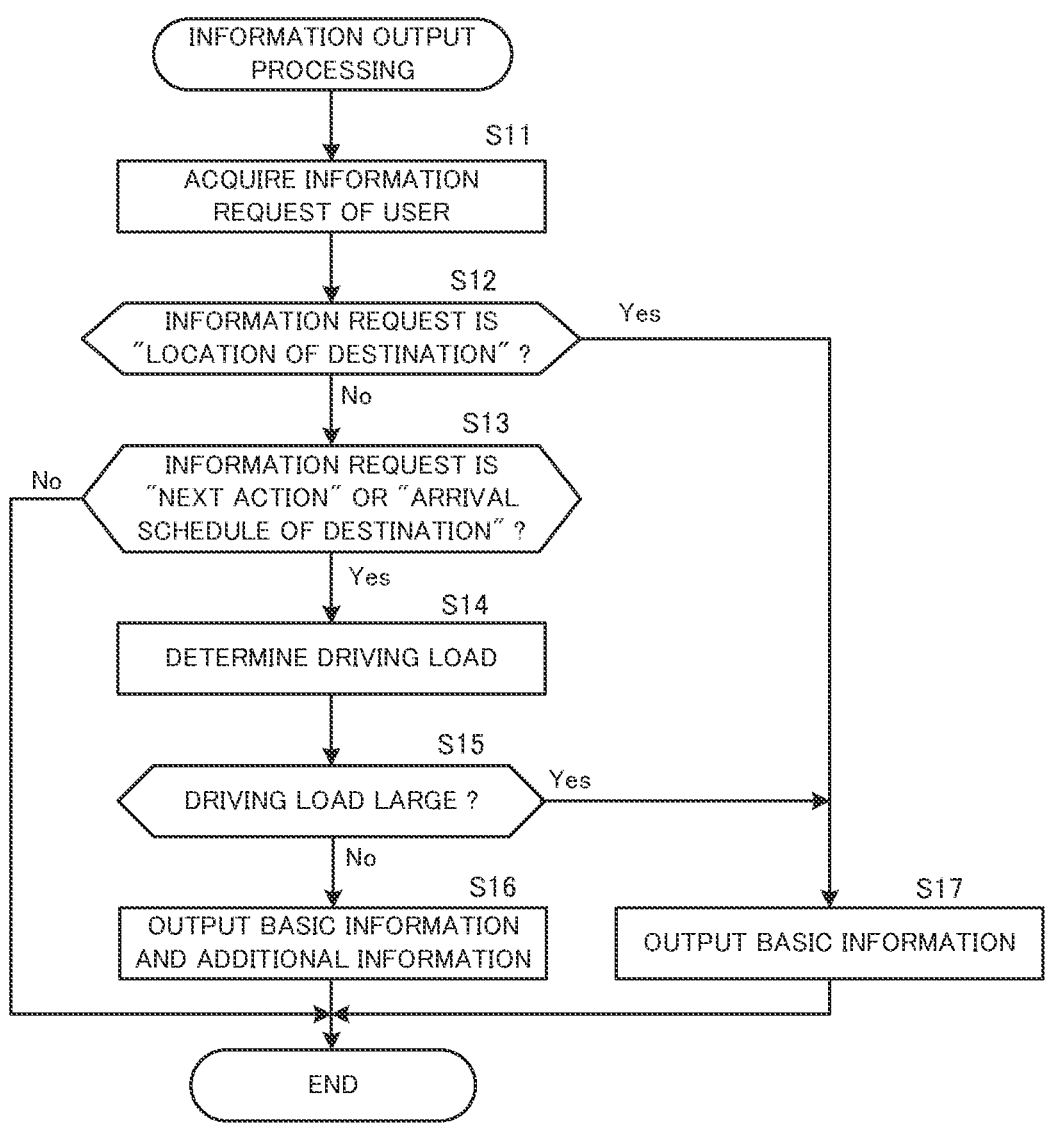
FIG. 4 is a flowchart of information output processing.

FIG. 4 is a flowchart of the information output processing according to the first embodiment. When the voice guidance device 1 acquires the information request of the user through the input unit 13 (Step S11), the voice guidance device 1 determines whether or not the information request is related to the location of the destination (Step S12). When the information request is related to the location of the destination (Step S12: Yes), the voice guidance device 1 outputs the basic information indicating the direction of the destination (Step S17), and ends the processing.

On the other hand, when the information request is not related to the location of the destination (Step S12: No), the voice guidance device 1 determines whether or not the information request relates to the next action to be taken or the arrival schedule to the destination (Step S13). If the information request does not relate to the next action to be taken and the arrival schedule to the destination (step S13: No), the voice guidance device 1 ends the processing.

On the other hand, when the information request relates to the next action to be taken or the arrival schedule to the destination (step S13: Yes), the voice guidance device 1 determines the driving load based on the traveling state of the vehicle Ve (step S14). Specifically, the voice guidance device 1 determines the driving load based on the traveling state, according to the example shown in FIG. 4. Then, the voice guidance device 1 determines whether or not the driving load is large (step S15). If the driving load is large (step S15: Yes), the voice guidance device 1 outputs only the basic information (step S17). That is, if the information request relates to the next action to be taken, the voice guidance device 1 outputs only the next guiding point. However, when the vehicle has already entered the intersection of the guide point, the voice guidance device 1 outputs only the subsequent (i.e., second) guiding point. In addition, if the information request relates to the arrival schedule to the destination, the voice guidance device 1 outputs only the remaining distance to the destination or the arrival time.

On the other hand, when the driving load is small (step S15: No), the voice guidance device 1 outputs additional information in addition to the basic information (step S16). That is, if the information request relates to the next action to be taken, the voice guidance device 1 outputs the subsequent (i.e., second) guidance point in addition to the next guidance point. Also, if the information request relates to the arrival schedule to the destination, the voice guidance device 1 outputs the presence or absence of the toll road use and the IC used next in addition to the remaining distance to the destination or the arrival time. Then, the processing ends.

Second Embodiment

Figure 5:
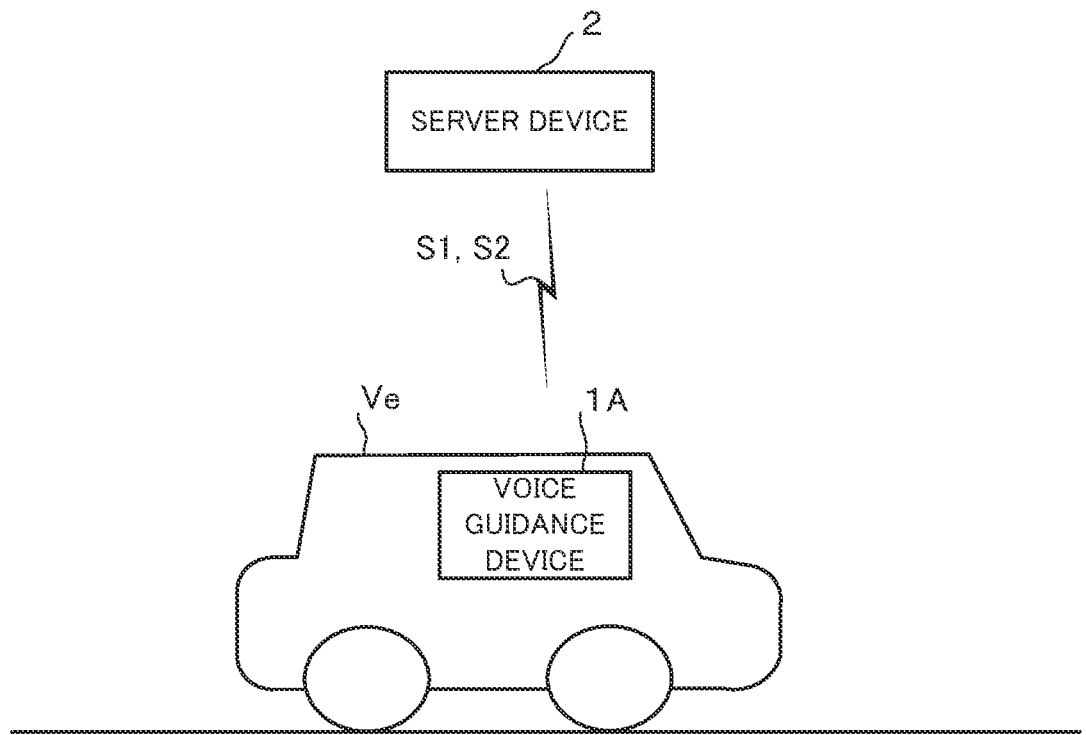
FIG. 5 is a configuration example of a voice guidance system according to a second embodiment.

FIG. 5 is a configuration example of a voice guidance system according to the second embodiment. The voice guidance system according to the second embodiment mainly includes a vehicle Ve, a voice guidance device 1A, and a server device 2. Incidentally, the same components as in the first embodiment are appropriately denoted by the same reference numerals as the components of the first embodiment, and the description thereof will be omitted.

The voice guidance device 1A has the same configuration as the voice guidance device 1 described in the first embodiment described above (see FIG. 2). In the second embodiment, since the server device 2 performs the route search processing and the route guidance processing based on the map DB 4, the voice guidance device 1A may not have a map DB 4. Then, when the voice guidance device 1A detects the input by the user specifying the destination or the like via the input unit 13, the voice guidance device 1A transmits the upload signal "S1" including the position information of the vehicle Ve outputted by the sensor group 15 and the information related to the specified destination to the server device 2. Also, when the user makes an information request, the voice guidance device 1A supplies the server device 2 with the upload signal S1 including information indicating the content or type of the information request and information regarding the traveling state of the vehicle Ve. Further, when the voice guidance device 1A receives the control signal "S2" related to the voice output from the server device 2 when the vehicle Ve is traveling, the voice guidance device 1A outputs voice by the voice output unit 17 based on the control signal S2. In this case, the voice guidance device 1A outputs information in response to the information request of the user, based on the control signal S2.

The server device 2 generates a route information indicating a guide route to be traveled by the vehicle Ve based on the upload signal S1 including a destination or the like received from the voice guidance device 1A. Then, the server device 2 generates the control signal S2 related to the information output for the information request of the user and the traveling state of the vehicle Ve on the basis of the information request of the user indicated by the upload signal S1 transmitted by the voice guidance device 1A. Then, the server device 2 transmits the generated control signal S2 to the voice guidance device 1A.

Figure 6:
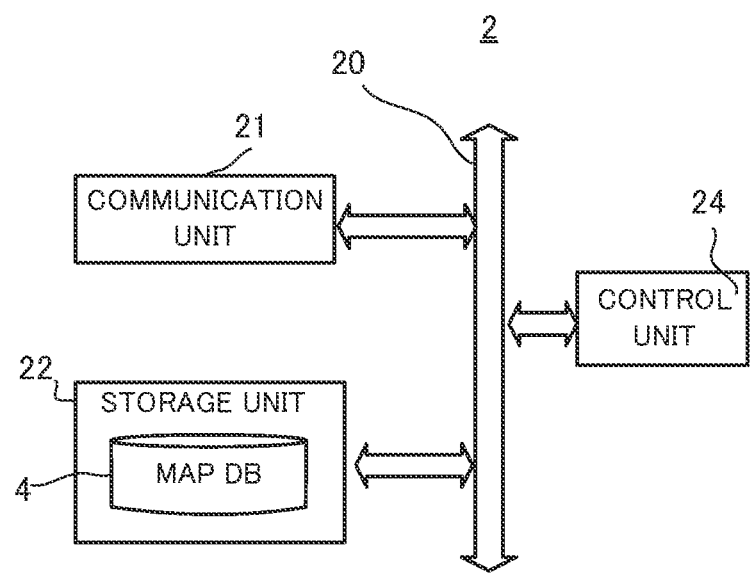
FIG. 6 illustrates an example of a schematic configuration of a server device.

FIG. 6 shows an example of a schematic configuration of the server device 2. The server device 2 mainly includes a communication unit 21, a storage unit 22, and a control unit 24. Each element in the server device 2 is interconnected via a bus line 20.

The communication unit 21 performs data communication with an external device such as a voice guidance device 1A under the control of the control unit 24. The storage unit 22 is composed of various memories such as a RAM, a ROM, and a non-volatile memory (including a hard disk drive, a flash memory, and the like). The storage unit 22 stores a program for the server device 2 to execute a predetermined processing. Further, the storage unit 22 includes a map DB 4. The control unit 24 includes a CPU, a GPU, and the like, and controls the entire server device 2. Also, the control unit 24 executes at least a part of the processing of the voice guidance device 1 described in the above example, by executing a program stored in the storage unit 22. For example, based on the upload signal S1 received via the communication unit 21 from the voice guidance device 1A, the control unit 24 generates the route information indicating the guide route, and generates the control signal S2 relating to the information output in response to the information request of the user. Then, the control unit 24 transmits the generated control signal S2 to the voice guidance device 1A by the communication unit 21.

Here, the server device 2 executes processing of the flowchart shown in FIG. 4 based on the upload signal S1 and the map DB 4. In this case, the server device 2 performs processing of steps S12 to S17 on the basis of the upload signal S1 including information on the information request of the user and the traveling state of the vehicle, generates the control signal S2 relating to the information output in response to the information request of the user, and transmits the control signal S2 to the voice guidance device 1A.

As described above, even when the server device 2 substantially controls the voice guidance device 1A related to the route guidance, the voice guidance system can output information of an appropriate amount according to the driving load in response to the user's information request, similarly to the first embodiment. In the second embodiment, the server device 2 is an example of an "information processing device".

<Modification>

Modifications to the above embodiments will be described below. The following modifications can be carried out in combination as appropriate.

(Modification 1)

In the above-described embodiments, as shown in FIG. 3, the voice guidance device 1 or 1A outputs only the basic information or the basic information and the additional information in response to the information request of the user in accordance with the driving load. Instead of preparing the information to be outputted separately as the basic information and the additional information in this manner, information of a small information amount and a large information amount may be prepared to select and output one of them according to the driving load. Specifically, the information including only the content of the basic information shown in FIG. 3 is prepared as the information having a small information amount, and the information including the content of the basic information and the additional information shown in FIG. 3 is prepared as the information having a large information amount. Then, the voice guidance device 1 or 1A outputs the information of the small information amount when the driving load is large, and outputs the information of the large information amount when the driving load is small.

(Modification 2)

In the above embodiments, the voice guidance device 1 mainly determines the driving load based on whether the vehicle Ve is traveling or parking/stopping. Instead, the voice guidance device 1 may determine the driving load based on the shape of the road on which the vehicle Ve travels. In this case, the voice guidance device 1 determines that the driving load is large if the road shape to be traveled is complex, and determines that the driving load is small if the road shape is simple. Further, the voice guidance device 1 may determine the driving load based on the need for lane change of the vehicle Ve. In this case, the voice guidance device 1 may determine that the driving load is large when the lane change is necessary, and may determine that the driving load is small when the lane change is not necessary. Further, the voice guidance device 1 may determine the driving load based on the traffic conditions around the vehicle Ve. In this case, the voice guidance device 1 may determine that the driving load is large if the area around the vehicle Ve is congested, and may determine that the driving load is small if the area around the vehicle Ve is not congested. Furthermore, the voice guidance device 1 may determine the driving load based on the driver's biometric information. In this case, the voice guidance device 1 detects the driver's heart rate and/or the perspiration state from the steering or the like. Then, the voice guidance device 1 may determine that the driving load is large when the driver is in an excited state, and may determine that the driving load is small when the driver is calm.

(Modification 3)

In the above embodiments, the information request is made by a voice input. However, the information request may be made, for example, by a predetermined information request button of hardware or software.

In the embodiments described above, the program may be stored using various types of non-transitory computer-readable medium and can be supplied to a control unit or the like that is a computer. The non-transitory computer-readable medium includes a storage medium (tangible storage medium) of various types of entities. Examples of the non-transitory computer-readable medium include a magnetic storage medium (e.g., a flexible disk, a magnetic tape, a hard disk drive), a magnetooptical storage medium (e.g., a magnetooptical disk), a CD-ROM (Read Only Memory), a CD-R, a CD-R/W, a solid-state memory (e.g., a mask ROM, a PROM (Programmable ROM), an EPROM (an Erasable PROM, a flash ROM, a RAM (Random Access Memory)).

While the present invention has been described with reference to the embodiments, the present invention is not limited to the above embodiments. Various changes that can be understood by those skilled in the art within the scope of the present invention can be made in the configuration and details of the present invention. In other words, it is needless to say that the present invention includes various modifications and modifications that could be made by a person skilled in the art according to the entire disclosure, including the scope of the claims, and the technical philosophy. In addition, each disclosure of the above-mentioned patent documents, etc. cited shall be incorporated with reference to this document.

BRIEF DESCRIPTION OF REFERENCE NUMBERS

1 Voice guidance device
2 Server device
4 Map DB
11, 21 Communication unit
12, 22 Storage unit
13 Input unit
14, 24 Control unit
15 Sensor group
16 Display unit
17 Voice output unit

The invention claimed is:

1. An information processing device which provides information relating to a movement of a mobile body on a guide route, the information processing device comprising:
   an input configured to receive an information request for the information relating to the movement of the mobile body on the guide route;
   one or more processors configured to
      determine a driver's driving load with respect to a driving of the mobile body,
      determine that the driver's driving load is large while the mobile body is traveling and when the mobile body is positioned within an intersection, and
      determine that the driver's driving load is small when the mobile body is stopped outside the intersection; and
   a speaker configured to output, in response to the information request, a basic information regarding the guide route when the driver's driving load is determined to be large and the mobile body is traveling and positioned within the intersection, and an additional information regarding the guide route in addition to the basic information when the driver's driving load is determined to be small and the mobile body is stopped outside the intersection, the basic information being one of a next guiding point on the guide route, a remaining distance on the guide route from a position of the mobile body to a destination of the mobile body, and a traveling direction of the mobile body along the guide route.

2. The information processing device according to claim 1,
   wherein the information request is related to a next action to be taken with respect to a traveling of the mobile body, and
   wherein the speaker outputs the information of the next guiding point on the guide route as the basic information during the traveling of the mobile body, and outputs the next guiding point as the basic information and outputs the information of a second guiding point on the guide route as the additional information when the mobile body is stopped outside the intersection.

3. The information processing device according to claim 1,
   wherein the information request is related to a next action to be taken with respect to a traveling of the mobile body, and
   wherein the speaker outputs the information of the next guiding point of the guide route of the intersection as the basic information when the mobile body is positioned within the intersection.

4. The information processing device according to claim 1,
   wherein the information request relates to an arrival schedule to the destination of the mobile body, and
   wherein the speaker outputs at least one of the remaining distance to the destination and an expected arrival time as the basic information while the mobile body is traveling, and outputs information regarding a use of a toll road as the additional information in addition to at least one of the remaining distance to the destination and the expected arrival time as the basic information when the mobile body is stopped outside the intersection.

5. The information processing device according to claim 1, wherein the one or more processors determines the driver's driving load based on at least one of a shape of a road on which the mobile body travels, necessity of lane change of the mobile body, and traffic conditions around the mobile body.

6. An information output method executed by an information processing device which provides information relating to a movement of a mobile body on the guide route, the method comprising:
   receiving an information request for the information relating to the movement of the mobile body on the guide route;
   determining a driver's driving load with respect to a driving of the mobile body;
   determining that the driver's driving load is large while the mobile body is traveling and when the mobile body is positioned within an intersection;
   determining that the driver's driving load is small when the mobile body is stopped outside the intersection; and
   outputting, in response to the information request, a basic voice information regarding the guide route when the driver's driving load is determined to be large and the mobile body is traveling and positioned within the intersection, and an additional voice information regarding the guide route in addition to the basic information when the driver's driving load is determined to be small and the mobile body is stopped outside the intersection, the basic information being one of a next guiding point on the guide route, a remaining distance on the guide route from a position of the mobile body to a destination of the mobile body, and a traveling direction of the mobile body along the guide route.

7. A non-transitory computer-readable medium storing a program executed by an information processing device including a computer and provides information relating to a movement of a mobile object on a guide route, the program causing the computer to:
   receive an information request for the information relating to the movement of the mobile body on the guide route;

determine a driver's driving load with respect to a driving of the mobile body;

determine that the driver's driving load is large while the mobile body is traveling and when the mobile body is positioned within an intersection;

determine that the driver's driving load is small when the mobile body is stopped outside the intersection; and output, in response to the information request, a basic information regarding the guide route when the driver's driving load is determined to be large and the mobile body is traveling and positioned within the intersection, and an additional information regarding the guide route in addition to the basic information when the driver's driving load is determined to be small and the mobile body is stopped outside the intersection, the basic information being one of a next guiding point on the guide route, a remaining distance on the guide route from a position of the mobile body to a destination of the mobile body, and a traveling direction of the mobile body along the guide route.

8. An information processing device which provides information relating to a movement of a mobile body on a guide route, the information processing device comprising:

an input configured to receive an information request for the information relating to the movement of the mobile body on the guide route;

one or more processors configured to determine when the mobile body is traveling and positioned in an intersection and determine when the mobile body is stopped outside the intersection; and a speaker configured to output, in response to the information request, basic information on the guide route during a travelling of the mobile body and when the mobile body is determined to be located in the intersection, the basic information being one of a next guiding point on the guide route, a remaining distance on the guide route from a position of the mobile body to a destination of the mobile body, and a traveling direction of the mobile body along the guide route, and output the basic information of the guide route and additional information in addition to the basic information of the guide route when the mobile body is determined to be stopped outside the intersection.

* * * * *